US012232245B2

(12) United States Patent
Abbasi

(10) Patent No.: US 12,232,245 B2
(45) Date of Patent: Feb. 18, 2025

(54) METHOD AND APPARATUS FOR PRODUCTION OF ACTINIUM 225 ISOTOPE

(71) Applicants: Ali A Abbasi, New York, NY (US); PotentAlpha Nükleer Tip Biyoteknoloji Klinik Araştirma ve Danişmanlik Limited Şirket, New York, NY (US)

(72) Inventor: Ali A Abbasi, New York, NY (US)

(73) Assignee: Ali A Abbasi, New York, NY (US)

( * ) Notice: Subject to any disclaimer, the term of this patent is extended or adjusted under 35 U.S.C. 154(b) by 0 days.

(21) Appl. No.: 18/124,123

(22) Filed: Mar. 21, 2023

(65) Prior Publication Data

US 2023/0298776 A1 Sep. 21, 2023

Related U.S. Application Data

(60) Provisional application No. 63/322,200, filed on Mar. 21, 2022.

(51) Int. Cl.
*H05H 6/00* (2006.01)
*G21K 5/08* (2006.01)
*G21G 1/00* (2006.01)
*G21G 1/10* (2006.01)

(52) U.S. Cl.
CPC ................. *H05H 6/00* (2013.01); *G21K 5/08* (2013.01); *G21G 1/00* (2013.01); *G21G 1/10* (2013.01)

(58) Field of Classification Search
CPC .................................. H05H 6/00; G21K 5/08
See application file for complete search history.

(56) References Cited

U.S. PATENT DOCUMENTS

| | | | | |
|---|---|---|---|---|
| 11,217,355 | B2 | 1/2022 | Nolen, Jr. et al. | |
| 2002/0094056 | A1* | 7/2002 | Satz | G21G 1/10 376/215 |
| 2017/0062087 | A1* | 3/2017 | Abbasi | A61N 5/1042 |
| 2017/0231080 | A1* | 8/2017 | Johnson | G21G 1/001 |
| 2017/0367170 | A1 | 12/2017 | Pärnaste et al. | |
| 2019/0311819 | A1* | 10/2019 | Henriksen | G21G 4/08 |

FOREIGN PATENT DOCUMENTS

| | | | |
|---|---|---|---|
| EP | 2146555 | A1 | 1/2010 |
| JP | 2019087461 | A | 6/2019 |
| WO | 2019053570 | A1 | 3/2019 |

OTHER PUBLICATIONS

International Search Report mailed on Jul. 12, 2023 in PCT/US2023/015738.

* cited by examiner

*Primary Examiner* — Sharon M Davis

(57) ABSTRACT

In one illustrative embodiment, a target insert for the production of Ac-225 in a particle accelerator is disclosed which may include a metal body comprising a central flat area deposition of Ra-226 or any means of depositing Ra226 on target body, a channel surrounding the perimeter of the central flat area and a hollow section opposite the central flat area. The target insert also includes an area of Ra-226 disposed on the central flat area and a protective layer disposed atop the area of Ra-226 and conforming to the metal target such that the protective layer is also disposed onto the channel surrounding the perimeter of the central flat area. A crimp ring is disposed on top of the protective layer in the channel surrounding the perimeter of the central flat area, wherein the crimp ring has been compressed to fill the channel and seal the protective layer to the metal body.

16 Claims, 16 Drawing Sheets

METHOD AND APPARATUS FOR PRODUCTION OF ACTINIUM 225 ISOTOPE

FIELD OF THE INVENTION

Generally, the present disclosure relates to method and apparatus for generation and/or production of Actinium-225 (Ac-225) isotope.

DESCRIPTION OF RELATED ART

Alpha particle therapy provides opportunity for the treatment of many cancers. However, production of alpha particle emitting isotopes is a very complex process with many technical and regulatory obstacles. Production of alpha particle emitting isotopes is also very expensive and difficult to scale up, which so far has resulted in alpha particle therapy being nonviable for commercialization and patient use. In general, a high-energy accelerator or a reactor with a complex and cumbersome process of bombardment, irradiation and conventional chemical separation have been needed to produce an alpha emitting isotope that could be used in radiolabeled drug product for human injection. Ac-225 is an alpha emitting isotope which has a suitable energy profile and chemistry for radiolabeling. This makes Ac-222 a very promising contender for treatment of various types of cancer used in TAT (Targeted Alpha Therapy). Ac-225 isotope may be produced by irradiation of Radium 226 (Ra-226), which is available from a reactor or nuclear waste generated in industry or government based nuclear plants, in a cyclotron or other particle accelerator.

However, irradiation of Ra-226 can cause spalling of Ra-226 and its decay products, such as Rn-222 gas with half-life of 3.5 days that then decays to polonium and subsequent products as shown in the decay chain of Ra-226 illustrated in FIG. 18, which can contaminate the accelerator systems. Therefore, it is desirable to devise a sealed target insert to facilitate conversion of Ra-226 to Ac-225 by irradiation. The sealed target insert and method for production disclosed herein also advantageously prevents Rn-222 gas emission as part of the Ra-226 decay chain during transport and storage of prepared a Ra-226 target insert before and after irradiation.

SUMMARY OF THE INVENTION

In one illustrative embodiment, a target insert for the production of Ac-225 in a particle accelerator is disclosed which may include a metal body comprising a central flat area for deposition (e.g. electroplating, micro-sputtering, boiling) of Ra-226 or any means of depositing Ra-226 on target body, a channel surrounding the perimeter of the central flat area and a hollow section opposite the central flat area. The target insert also includes an area of Ra-226 disposed on the central flat area and a protective layer disposed atop the area of Ra-226 and conforming to the metal target such that the protective layer is also disposed onto the channel surrounding the perimeter of the central flat area. A crimp ring is disposed on top of the protective layer in the channel surrounding the perimeter of the central flat area, wherein the crimp ring has been compressed to fill the channel and seal the protective layer to the metal body.

BRIEF DESCRIPTION OF THE FIGURES

The disclosed subject matter will hereafter be described with reference to the accompanying drawings, wherein like reference numerals denote like elements, and.

Figure 1:
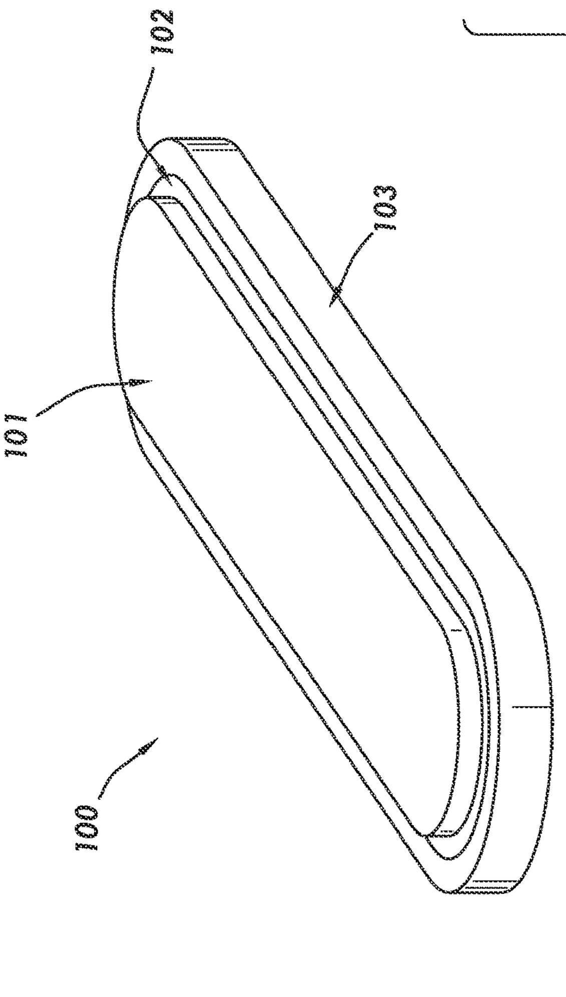
FIG. 1 depicts a perspective view of a Ra-226 target insert in accordance with an illustrative embodiment of the present disclosure.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

As used herein, the terms "coupled" or "couple" include both a direct connection and an indirect connection between components. With respect to components that direct fluids from one component to another, the terms "couple" or "coupled" includes connections via a pipe or other ducting to provide fluid communication between components.

Further, in the figures and the description, like numerals are intended to represent like elements.

Figure 2:
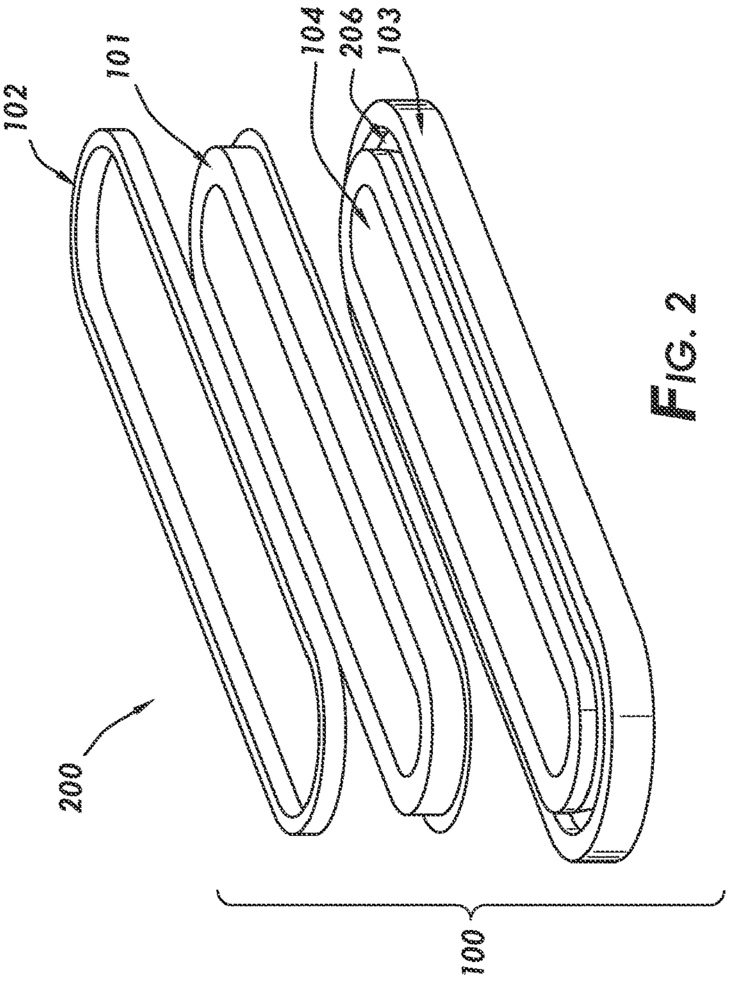
FIG. 2 depicts an exploded view of a Ra-226 target insert in accordance with an illustrative embodiment of the present disclosure.

With reference to FIG. 1, an illustrative embodiment of an Ra-226 target insert 100 is shown. In certain illustrative embodiments, the Ra-226 target insert 100 is designed to be mounted to the target receptacle of a cyclotron (not shown). A person of skill in the art having the benefit of the present disclosure would recognize that various shapes for Ra-226 target insert 100 may be chosen to fit a particular cyclotron target or a cyclotron from a particular manufacturer. While the Ra-226 target insert 100 of FIG. 1 is one shape shown for illustrative purposes, one of skill in the art would recognize that other shapes may be chosen for compatibility with different manufactures and models of particle accelerators. For example, the Ra-226 target insert 100 may be shaped as a disk/coin, oval, or rectangle or other polygon. In certain embodiments, the Ra-226 target insert 100 may include a protective layer 101, a crimp ring 102 and a target insert body 103. The protective layer 101 may be disposed on the target insert body 103, as is described in further detail herein. The crimp ring 102 may be disposed so as to substantially affix the protective layer 101 to the target insert body 103, as is describe in more detail herein. The protective layer 101 may be constructed of any suitable material as would be appreciated by those of ordinary skill in the art, having the benefit of the present disclosure. For example, in certain illustrative embodiments, the protective layer 101 may be constructed of materials such as Copper foil, Gold foil, Aluminum foil, and alloy foils such as Havar. As described in further detail in FIG. 2, an Ra-226 layer 104 (not shown in FIG. 1) may be disposed on a portion of the target insert body 103 between target insert body 103 and the protective layer 101, as shown in FIG. 2. In particular embodiments, the Ra-226 layer 104 may be deposited by electroplating, micro-sputtering, boiling, or other methods of depositing thin films as would be recognized by those of skill in the art with the benefit of the present disclosure.

Specifically, FIG. 2 provides an exploded view 200 of the Ra-226 target insert 100 shown in FIG. 1. As shown in FIG. 2, the Ra-226 layer 104 is disposed onto a portion of the surface of target insert body 103 between the target insert body 103 and the protective layer 101. When the protective layer 101 is affixed to the target insert body 103, as is described herein, the Ra-226 layer is disposed into a sealed compartment formed between the protective layer 101 and the target body 103 during the process of affixing the protective layer 101 to the target body 103 as is described more detail herein. The protective layer 101 may be placed over the Ra-226 layer 104 and held in place on target insert body 103 by a crimp ring 102. As discussed in more detail herein, the crimp ring 102 may be disposed in a manner to substantially seal the protective layer 101 to the target insert body 103. The protective layer 101 provides an airtight barrier that protects the Ra-226 layer 104 and prevents portions of the Ra-226 layer 104 from being released into the environment surrounding the Ra-226 target insert 100 during irradiation of Ra-226.

The Ra-226 layer 104 may be converted to Ac-225 by irradiation of Ra-226 target insert 100 in a particle accelerator. To affect the conversion of Ra-226 to Ac-225, the Ra-226 target insert 100 may be placed into a portion of a particle accelerator (not shown), such as a cyclotron, and exposed to a beam of proton radiation having an energy of at least approximately 22.5 mega-electron volts (MeV). In some embodiments, the Ra-226 target may be placed in a holding chuck or other receptacle located in a vacuum chamber that may be coupled to the accelerator. In some embodiments the vacuum chamber, may be placed in a hot cell that is connected to an accelerator through a rabbit system (not shown). The Ra-226 target insert 100 is oriented in such a way that the accelerator beam may be directed onto Ra-226 layer 104. After the Ra-226 target insert 100 is placed into the accelerator target body (not shown) it may be coupled to the accelerator beam port (not shown). The operation of a particle accelerator and associated target system would be understood by one of skill in the art having the benefit of the present disclosure. Once coupled to the accelerator beam port, the surface of Ra-226 target insert 100 may be exposed to a beam of radiation (i.e., a proton beam) from the particle accelerator. The proton beam may be directed at the surface of Ra-226 target insert 100 at any angle. In a particular embodiment the proton beam may intersect the surface of Ra-226 target insert 100 at an angle between approximately 0 and 180 degrees, depending on the particle accelerator model and manufacturer. In certain embodiments, the proton beam may intersect the surface of Ra-226 target insert 100 at an angle between approximately 1 and 90 degrees. The proton beam passes through protective layer 101 and contacts the Ra-226 layer 104. The protective layer 101 may degrade the energy of the proton beam. For example, a proton beam having an energy of approximately 23.5 MeV may be degraded to an energy of approximately 22.5 MeV after passing through the protective layer 101. The energy degradation caused by the protective layer 101 may be a function of its composition and thickness. Those having skill in the art, with the benefit of the present disclosure, would recognize the need to choose an appropriate combination of proton beam energy and protective layer 101 thickness and material to ensure an energy delivery of at least approximately 22.5 MeV to Ra-226 layer 104, which is needed for conversion of Ra-226 to Ac-225.

Incidence of the proton beam upon the Ra-226 layer 104 generates heat, which must be conducted away from the Ra-226 layer 104 by the target insert body 103 to prevent overheating of the Ra-226 layer 104 and the Ra-226 target insert 100 as a whole. The target insert body 103 may be actively cooled to accomplish cooling of the Ra-226 layer 104. For example, in certain illustrative embodiments, the target insert body 103 may be mounted to a cooling plate cooled by a liquid cooling. As would be understood by those of skill in the art with the benefit of this disclosure, the cooling system is generally part of a particular particle accelerator and is included with that accelerator's target system, and thus the Ra-226 target insert of the present disclosure may be configured to be compatible with the desired particle accelerator cooling system and target. For example, as would be appreciated by those of ordinary skill in the art, having the benefit of the present disclosure, most accelerator target systems in which the Ra-226 target insert 100 may be mounted include a liquid cooling apparatus. Alternatively, the target insert body 103 may be mounted in the accelerator chamber (not shown) to a device that directly or indirectly brings a cooling fluid in contact with the back of target insert body 103. In some embodiments, the target insert body 103 may contain one or more cooling channels or a hollow portion to provide an improved contact area for the cooling fluid and facilitate flow of the cooling fluid, as shown, for example, in FIG. 3. The target insert body 103 may be constructed from any sufficiently conductive material, including metals and ceramics. In certain embodiments, the target insert body 103 may be constructed from aluminum, gold, tungsten, copper, iron, nickel, palladium, platinum, titanium, and combinations and alloys thereof.

Figure 3:
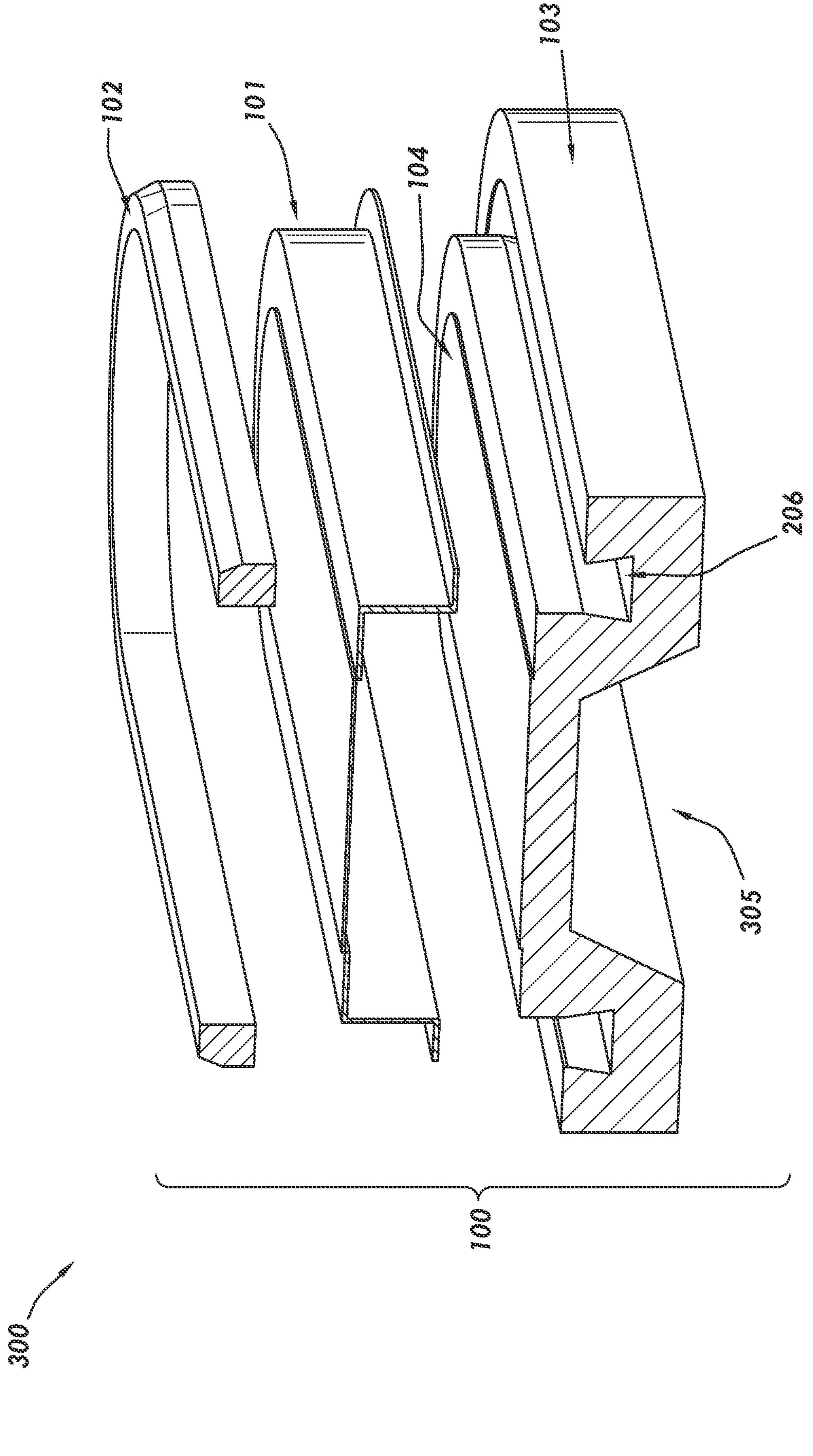
FIG. 3 depicts an exploded cross-section view of a Ra-226 target insert in accordance with an illustrative embodiment of the present disclosure.

FIG. 3 provides an illustration of a cross section 300 of the exploded view 200 of the Ra-226 target insert 100. As shown in FIG. 3, the target insert body 103 may be formed to have a hollow portion 305 on the back side of the portion of the target insert body 103 underlying the Ra-226 layer 104. The hollow portion 305 may include one or more channels or hollow areas to facilitate cooling fluid flow along the back of the Ra-226 target insert 100. The hollow portion 305 decreases the distance between the irradiated Ra-226 layer 104 and the cooling fluid or element, enhancing heat conduction away from the Ra-226 layer 104. Additionally, the implementation of the hollow portion 305 advantageously reduces the mass of Ra-226 target insert 100, thereby increasing the efficiency of fluid cooling and reducing the weight of Ra-226 target insert 100.

Figure 4:
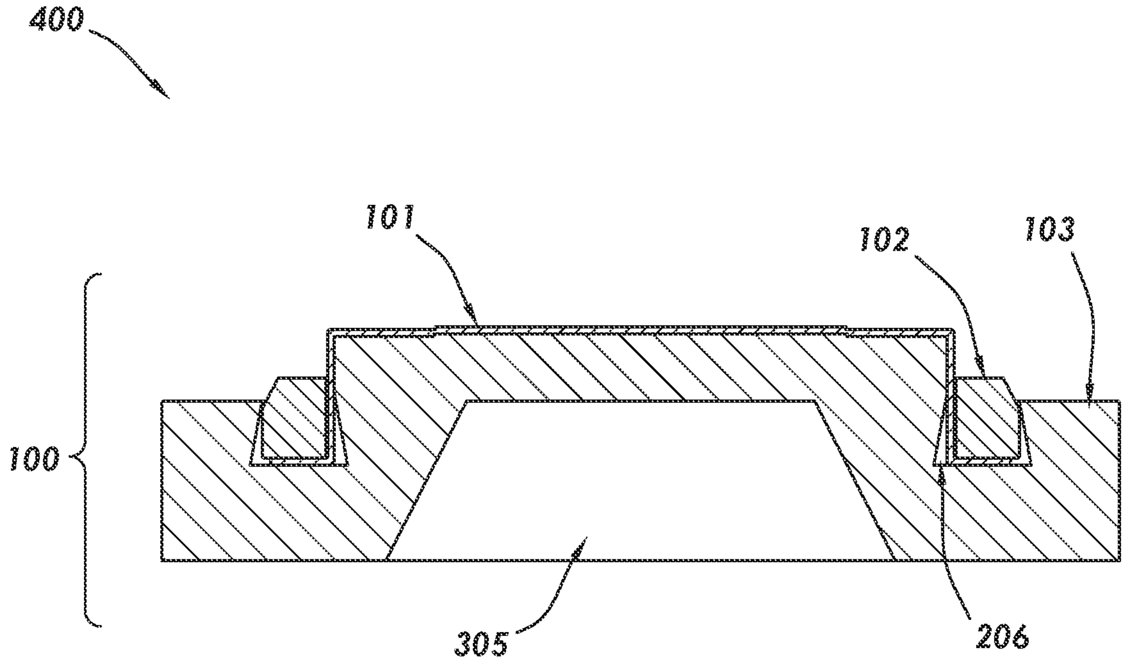
FIG. 4 depicts a cross-section view of a Ra-226 target insert prior to crimping in accordance with an illustrative embodiment of the present disclosure.
Figure 5:
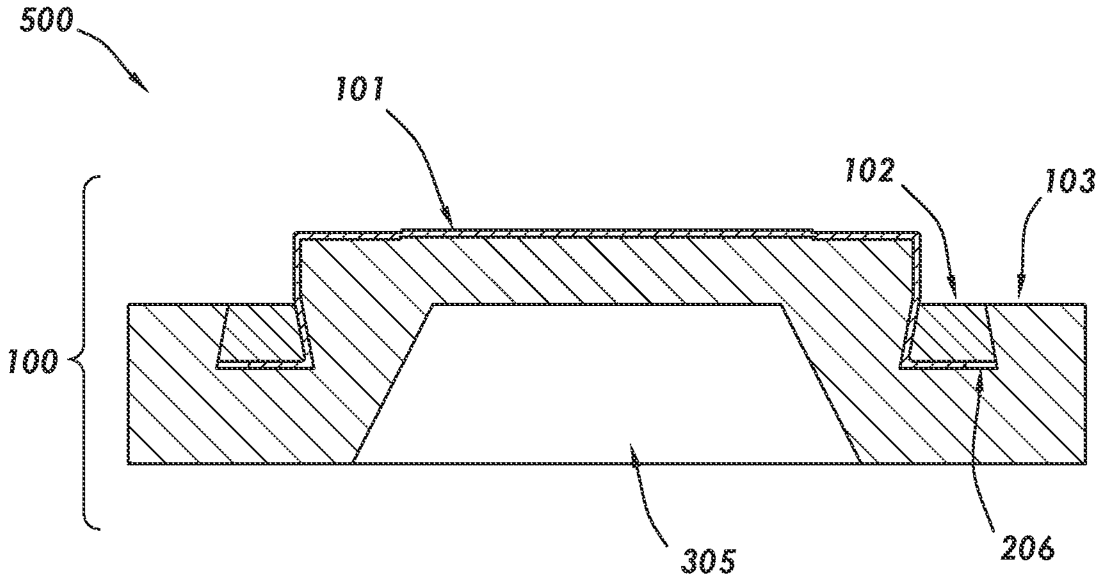
FIG. 5 depicts a cross-section view of a Ra-226 target insert after crimping in accordance with an illustrative embodiment of the present disclosure.
Figure 6:
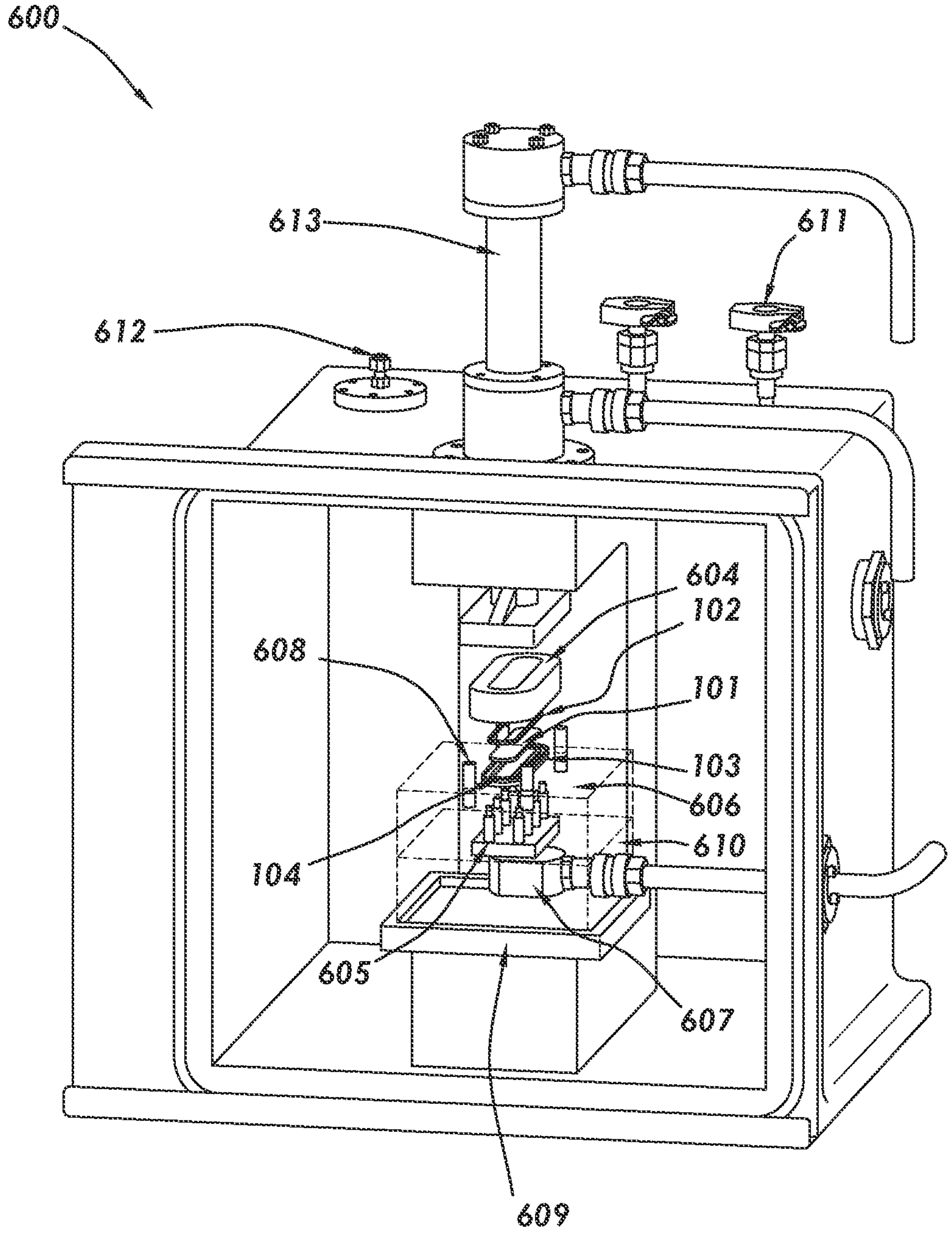
FIG. 6 depicts an apparatus for assembly of an Ra-226 target insert with an exploded view of an Ra-226 target insert in accordance with an illustrative embodiment of the present disclosure.

FIGS. 4 and 5 depict a cross section of the Ra-226 target insert 100 prior to compression of the crimp ring 102 and after the compression of the crimp ring 102, respectively, according to an illustrative embodiment. Specifically, the cross section 400 shows a cross section of the Ra-226 target insert 100 prior to compression of the crimp ring 102 to affix the protective layer 101 in place. During assembly, the protective layer 101 is placed atop the target insert body 103 and the crimp ring 100 is aligned with the target channel 206 atop the protective layer 101. In certain illustrative embodiments the components may be placed in an assembly chamber, for example the chamber of assembly system 600 illustrated in FIGS. 6 through 9, prior to alignment or aligned within the chamber. Next, the assembly chamber may be evacuated and purged with helium before crimping takes place. Next, pressure is applied to the top of the assembly to remove any air or other material from between protective layer 101 and the target insert body 103. The application of pressure, for example by a die, as is described in greater detail with respect to FIGS. 6-9 may cause crimp ring 102 to deform, thereby filling target channel 206 to seal the protective layer 101 to the target insert body 103, as shown in cross section 500 of FIG. 5. In alternative embodiments, the crimp ring 102 may be welded to the protective layer 101 and the target insert body 103 to provide a seal. In yet other embodiments, the protective layer 101 may be welded directly to the target insert body 103 along the circumference of the target channel 206. In certain embodiments, there area of target channel 206 may by level with the perimeter of target insert body 103 to provide a flat surface for spot welding (not shown).

FIGS. 6-9 provides an illustration of an assembly apparatus 600 for assembly of an Ra-226 target insert 100, according to an illustrative embodiment of the present disclosure. The illustrated components of assembly apparatus 600 includes a compression die 604, one or more ejector pins 605 disposed under the compression die, an upper target insert die 606 disposed under the compression die to provide a stable base for crimping of the Ra-226 target insert, a release pneumatic/hydraulic cylinder 607 disposed below the upper target insert die 606 and the ejector pins 605 and coupled to the ejector pins 605 to provide actuation to the ejector pins 605, one or more alignment pins 608 disposed between the upper target insert die 606 and the compression die 604 and coupled to the upper target insert die 606, and a base centering plate 609 disposed below and coupled to a lower target insert die 610 which is disposed below and coupled to the upper target insert die 606 to provide a stable structure for upper target insert die 606. The assembly apparatus 600 may also include one or more vacuum ports 611 and a gas port 612 coupled to the assembly chamber of assembly apparatus 600, and a compression pneumatic/hydraulic cylinder 613 disposed above upper target insert die 606 and coupled to the compression die 604 in a manner that allows for exchange of the compression die 604 with other compression dies 604 having differing geometry or with the punch die 704 described herein with respect to FIGS. 10-13. In some embodiments, assembly apparatus may include a plurality of vacuum ports 611, for example one that may couple assembly apparatus 600 to a rough vacuum pump and one that may couple assembly apparatus 600 to a second vacuum pump, an helium gas pump, an atmospheric vent, or pressure relief valve.

The components of the Ra-226 target insert 100 may be inserted into assembly apparatus 600 as described in further detail below. These components may include: the target insert body 103 of the Ra-226 target insert 100; the protective layer 101 of the Ra-226 target insert 100, which as described above may be a foil in certain embodiments; the crimp ring 102 of the Ra-226 target insert 100, which may also be a metal compression O-ring; and an electroplated Ra-226 layer 104 of the Ra-226 target insert 100.

Figure 7:
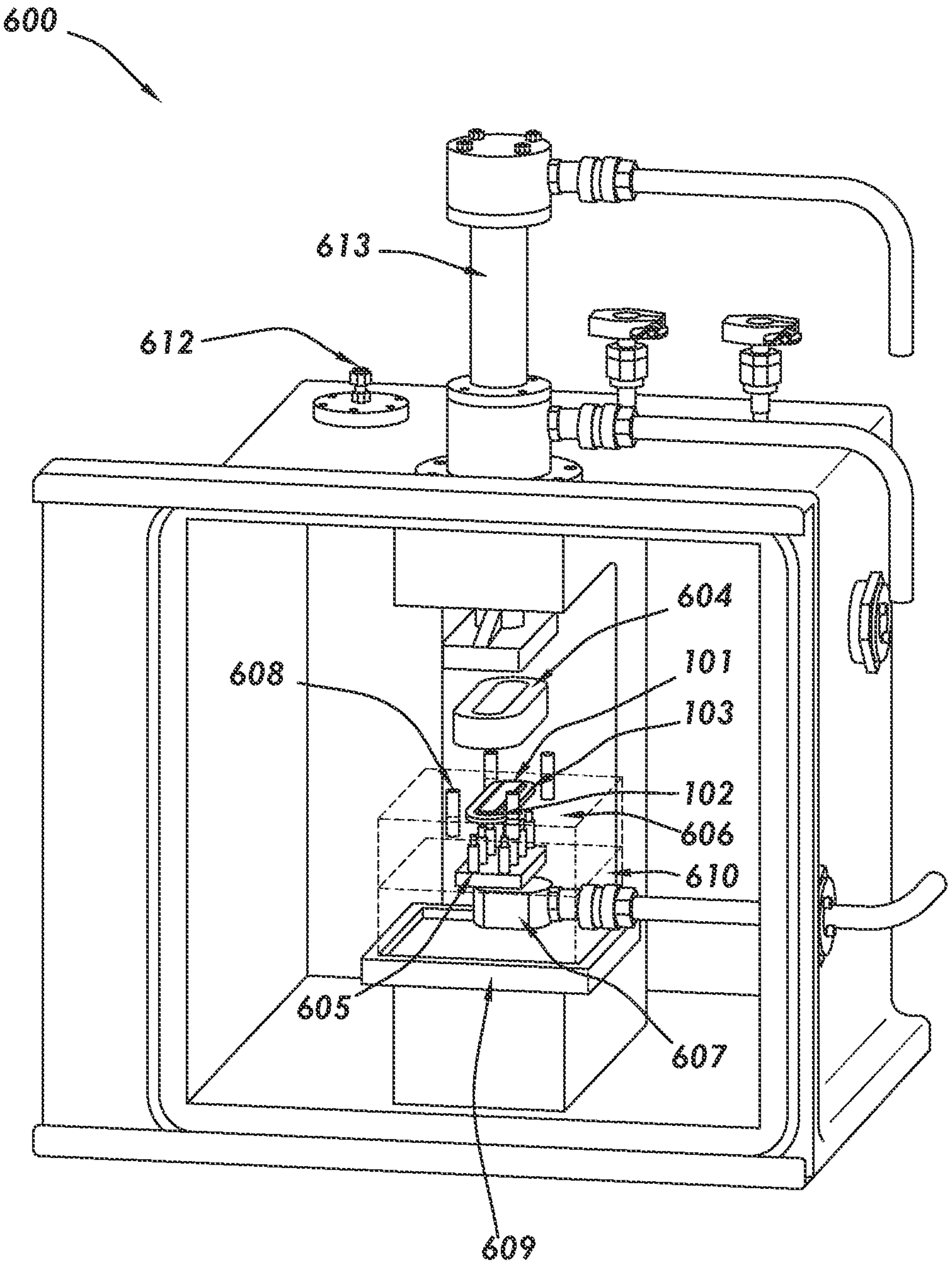
FIG. 7 depicts an apparatus for assembly of an Ra-226 target insert with aligned components of the Ra-226 target insert in accordance with an illustrative embodiment of the present disclosure.
Figure 16:
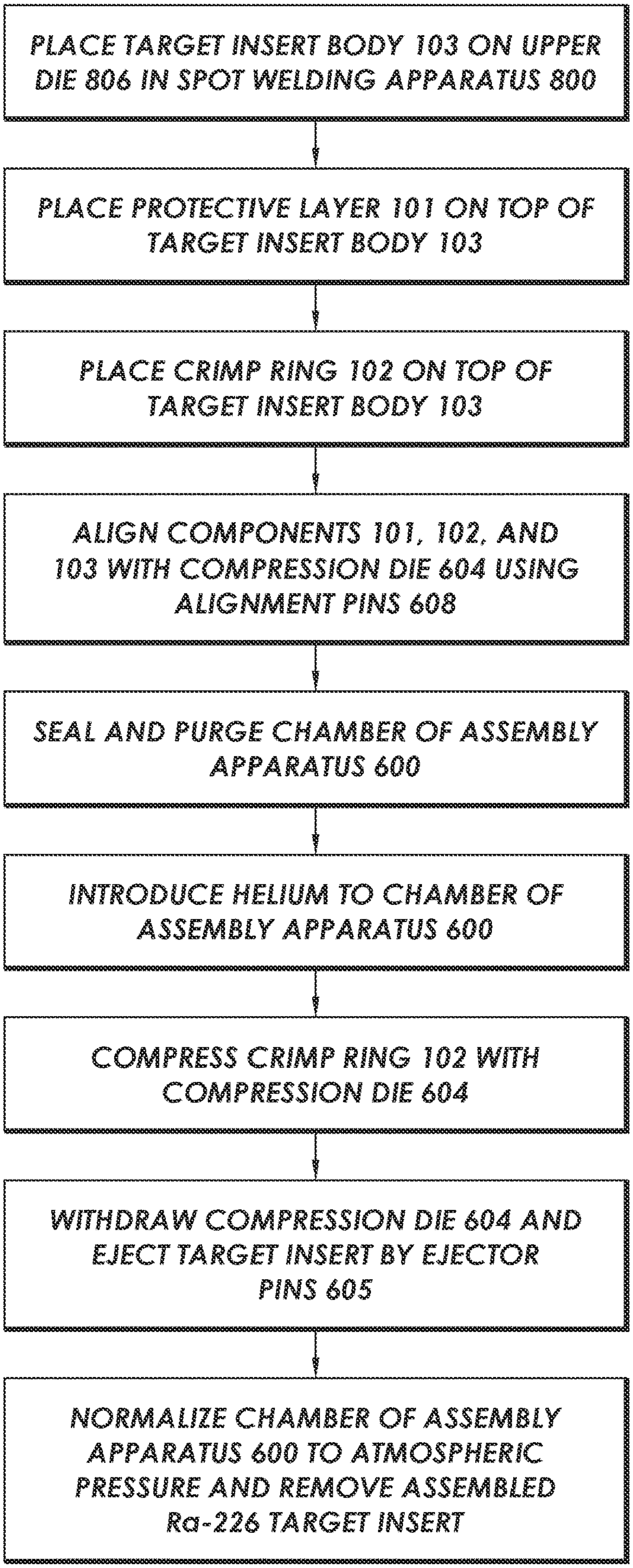
FIG. 16 provides a flow diagram of a method for producing a crimped Ra-226 target insert in accordance with certain illustrative embodiments of the present disclosure.

A method for assembly of the Ra-226 target insert by crimping is illustrated by FIG. 16 and described below according to an illustrative embodiment of the present disclosure. To assemble the illustrated embodiment of the Ra-226 target insert 100, first, the target insert body 103 is placed onto the upper target insert die 606 within the chamber of assembly apparatus 600. Next, the protective layer 101 is placed atop target insert body 103. Next, the crimp ring 102 is placed atop the protective layer 101 and the target insert body 103. This arrangement is shown in FIG. 7, which illustrates the alignment of the target insert body 103, the protective layer 101, and the crimp ring 102 prior to compression.

Next, the compression die 604 is aligned with the crimp ring 102 by the alignment pins 608. The compression die 604 may be a metal die shaped to align with the crimp ring 102 and transfer sufficient force from the compression hydraulic/pneumatic cylinder 613 to the crimp ring 102 to deform it to seal the protective layer 101 to the target insert body 103 as illustrated in FIGS. 4 and 5. Next, the internal chamber of the assembly apparatus is sealed from the outside environment and is purged of air through the vacuum port 611, which is used to couple assembly apparatus 600 to a vacuum pump (not shown). After a vacuum has been drawn inside of the assembly apparatus 600 through the vacuum port 611, the vacuum port 611 may be closed by a valve, and the internal chamber of the assembly apparatus 600 may be filled with a desirable gas (e.g., helium) through the gas port 612, which may couple assembly apparatus 600 to an inert gas source such as a gas tank. In certain illustrative embodiments, helium is the gas used to purge after drawing a vacuum because helium is largely transparent to cyclotron radiation, so presence of a small amount of helium between the protective layer 101 and target insert body 103 is not detrimental to conversion of Ra-226 to Ac-225.

Figure 8:
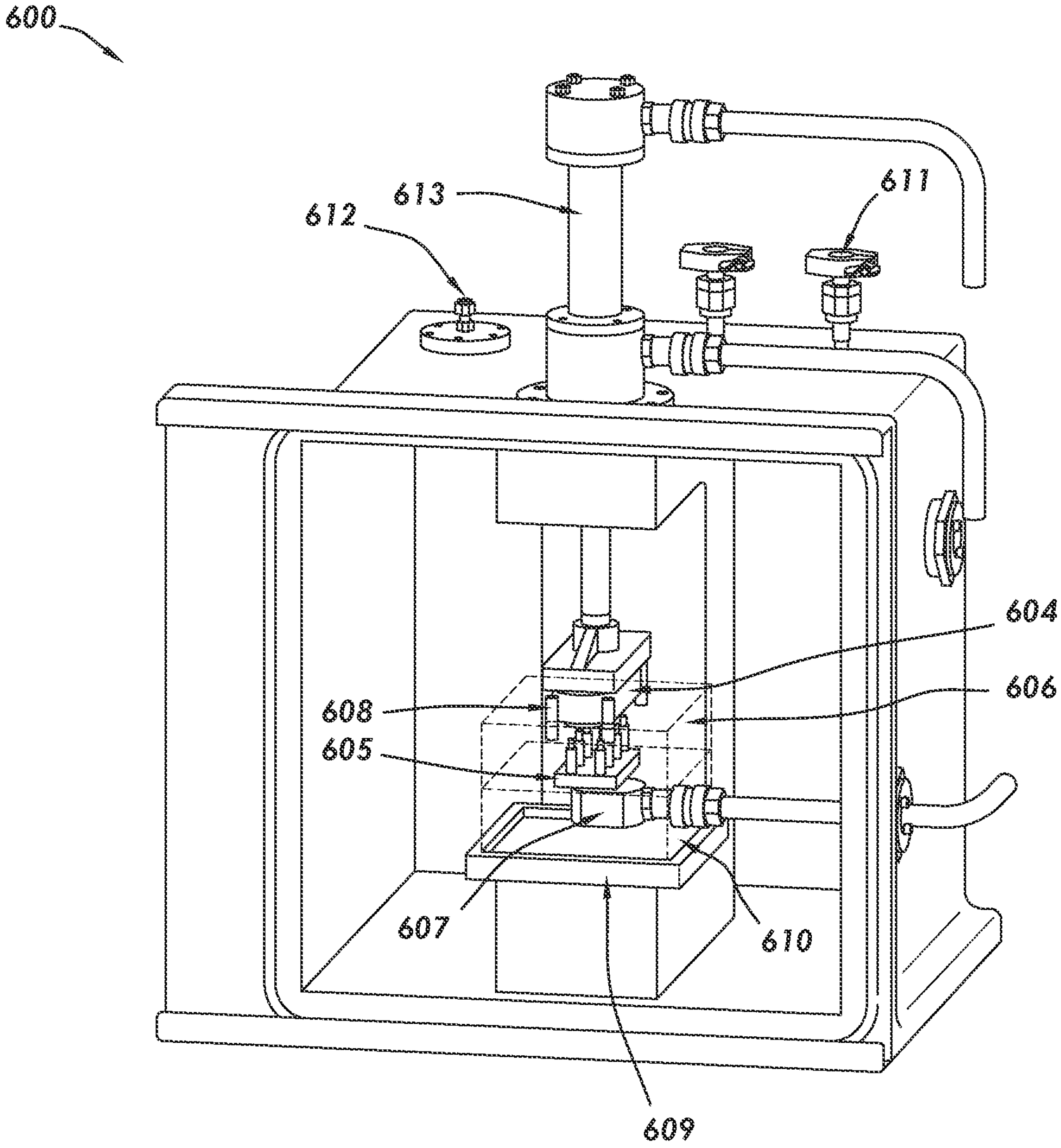
FIG. 8 depicts an apparatus for assembly of an Ra-226 target insert during compression for crimping of the Ra-226 target insert in accordance with an illustrative embodiment of the present disclosure.

Next, pressure is exerted on the compression die 604 by the compression pneumatic/hydraulic cylinder 613 to compress the compression crimp ring 102 to the protective layer 101 of the target insert body 103, as illustrated in FIG. 8. The base centering plate 609 and the lower insert die 610 provide a stable base for the upper insert die 606 to ensure that it is maintained in alignment during compression of the compression crimp ring 102 by the compression die 604.

After compressing the compression crimp ring 102, the compression die 604 may be withdrawn. After withdrawal of the compression die 604, the assembled Ra-226 target insert 100 may be removed from the upper insert die 606 by the ejector pins 605. The pneumatic/hydraulic cylinder 607 actuates the ejector pins 605 which provide upward pressure on the assembled Ra-226 target insert 100 through holes in the upper insert die 606 to remove or dislodge the Ra-226 target insert 100 from the upper insert die 606. Finally, the chamber of the assembly apparatus 600 may be normalized to atmospheric pressure so that it can be opened and the assembled Ra-226 target insert can be removed. This process may then be repeated to manufacture additional Ra-226 targets.

Figure 9:
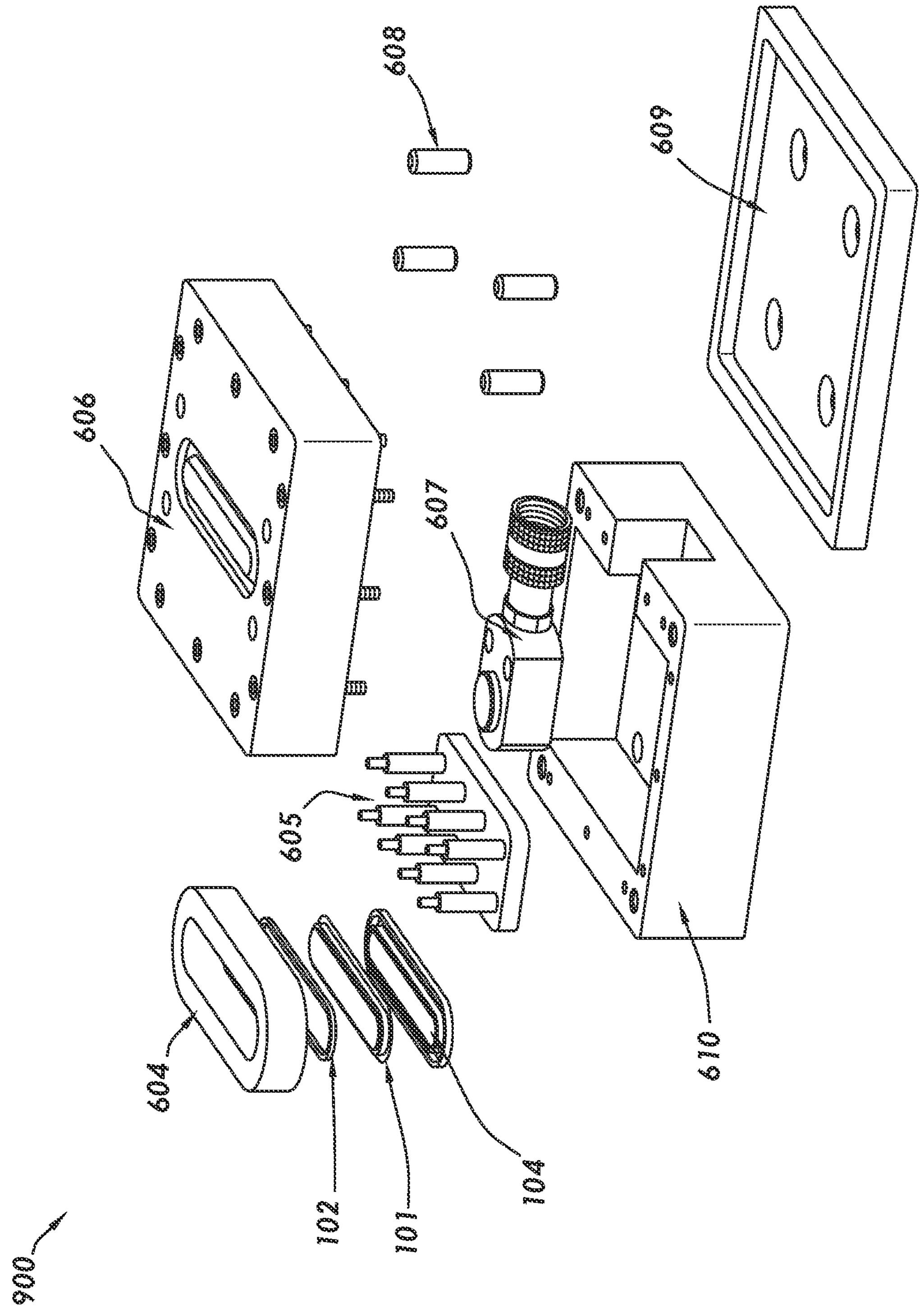
FIG. 9 depicts an exploded view of an apparatus for assembly of an Ra-226 target insert in accordance with an illustrative embodiment of the present disclosure.

FIG. 9 provides an illustration of a close-up exploded view 900 of components of the assembly apparatus 600 for assembly of Ra-226 target insert 100, according to an illustrative embodiment of the present disclosure. The illustration provided in FIG. 9 includes the same components as described with respect FIGS. 6-8 and the illustrated components of assembly apparatus 600 include a compression die 604, ejector pins 605, upper target insert die 606, release pneumatic/hydraulic cylinder 607, alignment pins 608, base centering plate 609, and lower target insert die 610, vacuum port 611, gas port 612, and compression pneumatic/hydraulic cylinder 613. The components of Ra-226 target insert 100 may be inserted into assembly apparatus 600 as described above with respect to FIGS. 6-8.

Figure 10:
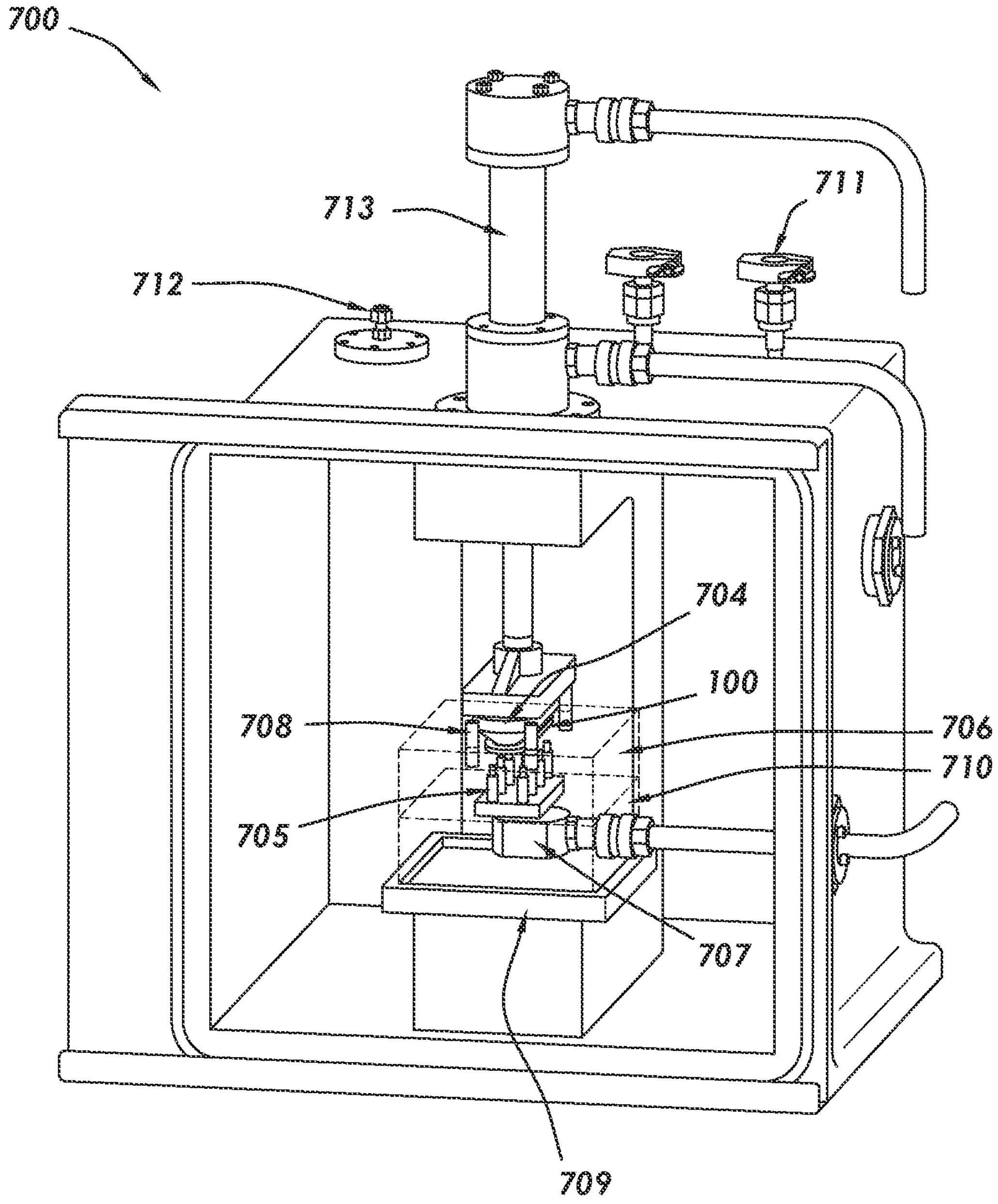
FIG. 10 depicts an apparatus for removing a protective layer from an irradiated Ra-226 target insert with a punch aligned to the irradiated Ra-226 target insert in accordance with an illustrative embodiment of the present disclosure.
Figure 11:
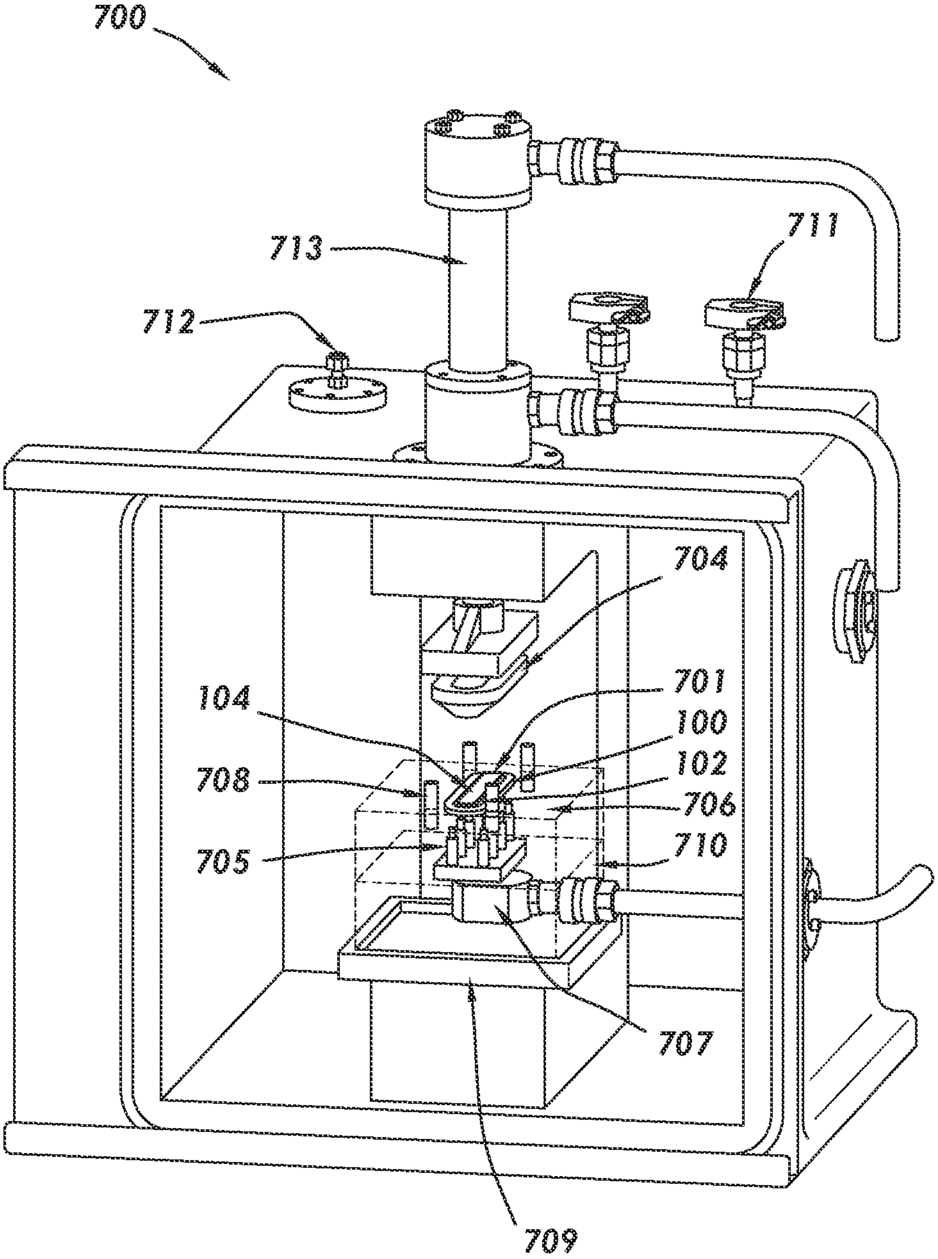
FIG. 11 depicts an apparatus for removing a protective layer from an irradiated Ra-226 target insert after removal of the protective layer in accordance with an illustrative embodiment of the present disclosure.
Figure 12:
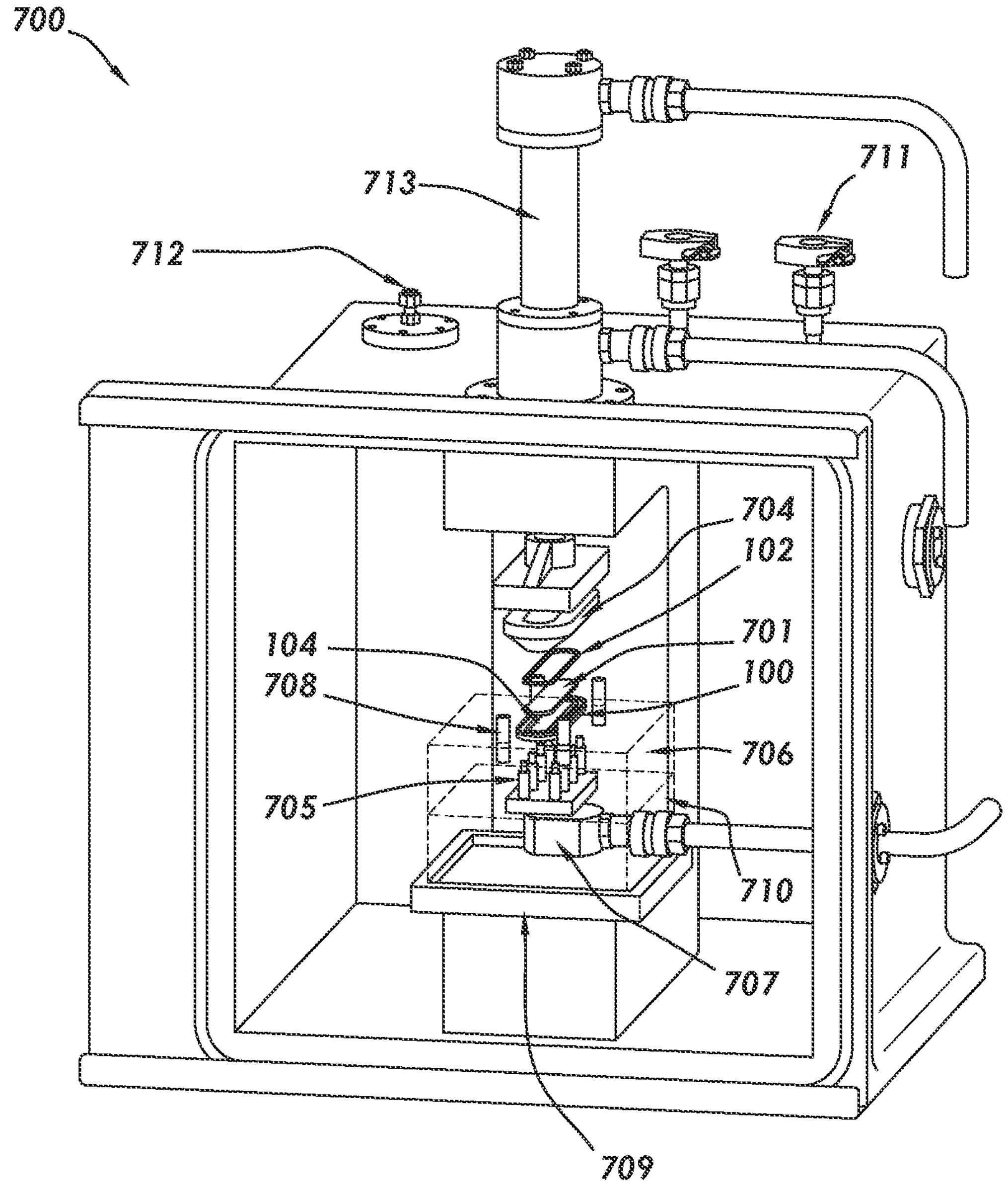
FIG. 12 depicts an apparatus for removing a protective layer from an irradiated Ra-226 target insert with an exploded view of the irradiated Ra-226 target insert in accordance with an illustrative embodiment of the present disclosure.
Figure 13:
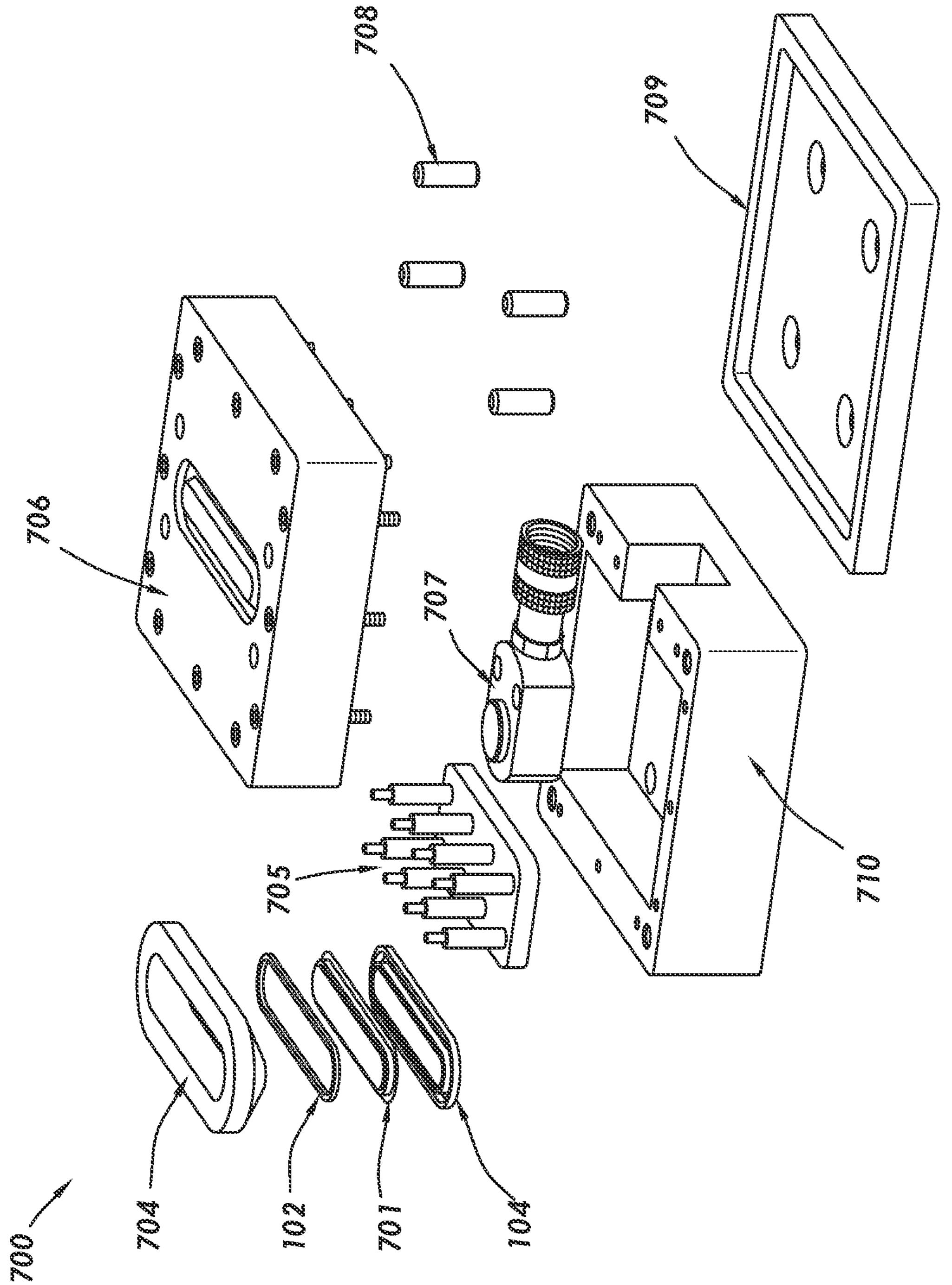
FIG. 13 depicts an exploded view of an apparatus for removing a protective layer from an irradiated Ra-226 target insert in accordance with an illustrative embodiment of the present disclosure.

FIGS. 10-13 illustrate a punch apparatus 700 which may be used to remove the protective foil 101 from the Ra-226 target insert 100 after irradiation of the Ra-226 layer 104 to convert the Ra-226 layer to Ac-225 according to an illustrative embodiment of the present disclosure. Specifically, FIG. 10 depicts punch apparatus 700 during punch contact with the irradiated Ra-226 target insert 100 to remove the protective foil 101 and FIG. 11 depicts punch apparatus 700 after removal of the protective foil 101. FIG. 12 depicts an exploded illustration of the Ra-226 target insert 100 after punching to remove protective layer 101 from Ra-226 target insert 100 and FIG. 13 depicts an exploded illustration 1300 of the internal components of the punch apparatus 700.

Punch apparatus 700 includes a punch 704 coupled to a punch pneumatic/hydraulic cylinder 713 and disposed above an upper target insert die 706 and one ore more alignment pins alignment pins 708 that are coupled to the upper target insert die 706. An upper target insert die 706 is disposed above one or more ejector pins 705 which are coupled to an ejection pneumatic/hydraulic cylinder 707. A Lower target insert die 710 is disposed below and coupled to the upper target insert die 706. A base centering plate 709 is disposed below and coupled to the lower target insert die 710 to provide structural rigidity for upper target insert die 706. The punch apparatus 700 also may include a one or more vacuum ports 711 and a gas port 712 that are coupled to the chamber of assembly apparatus 700.

To remove the foil from an irradiated Ra-226 target 100 to allow access to the Ac-225, first the irradiated Ra-226 target 100 is inserted into the upper insert die 706. The internal chamber of the punch apparatus 700 is next sealed to the outside environment and a vacuum may be drawn in the chamber of punch apparatus 700 through vacuum port 711, which may couple the punch apparatus 700 to a vacuum pump (not shown). After a vacuum is drawn on the interior of punch apparatus 700, it may be filled with a desirable gas (e.g., helium) through the gas port 712, which may couple punch apparatus 700 to a helium or other inert gas source such as a tank (not shown). In some embodiments, the same apparatus may be used for assembly apparatus 600 and punch apparatus 700 by simply substituting the compression die 604 with the punch 704.

Next the punch 704 is aligned with the portion of the protective foil 101 corresponding to the electroplated area 104 (which has been converted from Ra-226 to Ac-225 by irradiation in a particle accelerator) by the alignment pins 708. Punch 720 is shaped in a manner to apply pressure sufficient to break protective layer 101 along the perimeter of the electroplated area 104 of target 100 to allow for removal of a portion of the protective layer 101 covering irradiated electroplated area 104. Pressure is exerted on the punch 704 by punch pneumatic/hydraulic cylinder 713 to provide pressure to protective foil 101, which may cause the protective foil 101 to separate from the irradiated Ra-226 target insert 100. Next, the punch 704 is withdrawn from the surface of the irradiated Ra-226 target insert 100, as shown in FIG. 11. In some embodiments, a vacuum may be drawn on the interior of punch 704 to cause the punched portion of the protective foil 101 to adhere to the punch 704 for removal form irradiated Ra-226 target insert 100. Next the punched, irradiated Ra-226 target 100 may be removed from the punch apparatus by ejector pins 708 in a manner similar to that described above with respect to assembly apparatus 600. Finally, the chamber of the punch apparatus 700 may be normalized to atmospheric pressure so that it can be opened and the exposed, irradiated Ra-226 target insert can be removed.

Alternatively, the protective layer 101 may be spot welded to the target insert body 103 instead of being crimped into place as described above. If the protective layer 101 is spot welded to target insert body 103 then crimp ring 102 does not need to be present and instead protective layer 101 may be directly fused to the target insert body 103 around the perimeter of the electroplated Ra-226 area 104, for example in channel 206. However, in some embodiments, the crimp ring 102 may be spot welded to the protective layer 101 and target insert body 103 after being crimped.

Figure 14:
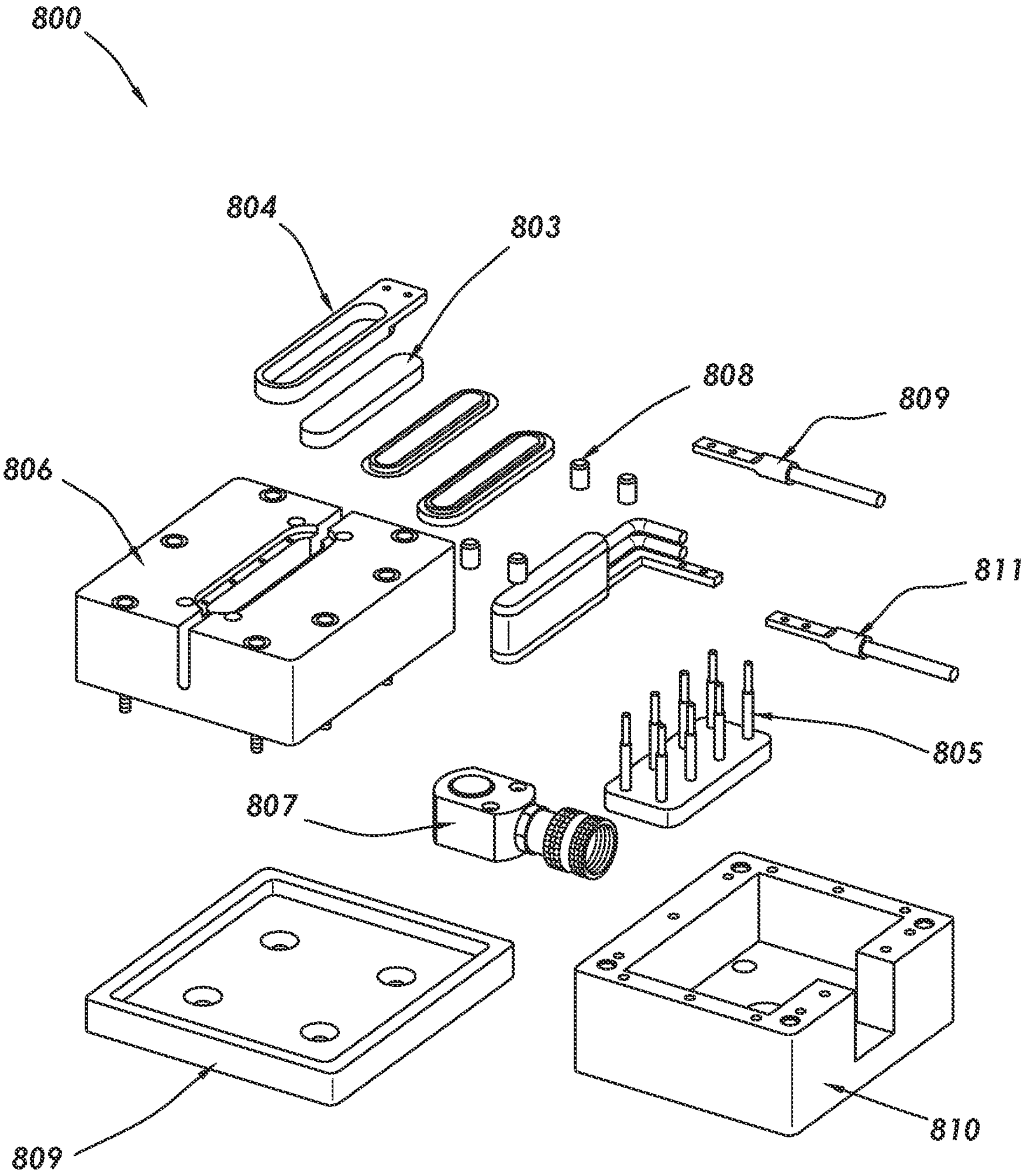
FIG. 14 depicts an exploded view of an apparatus for spot welding an Ra-226 target insert in accordance with an illustrative embodiment of the present disclosure.
Figure 15:
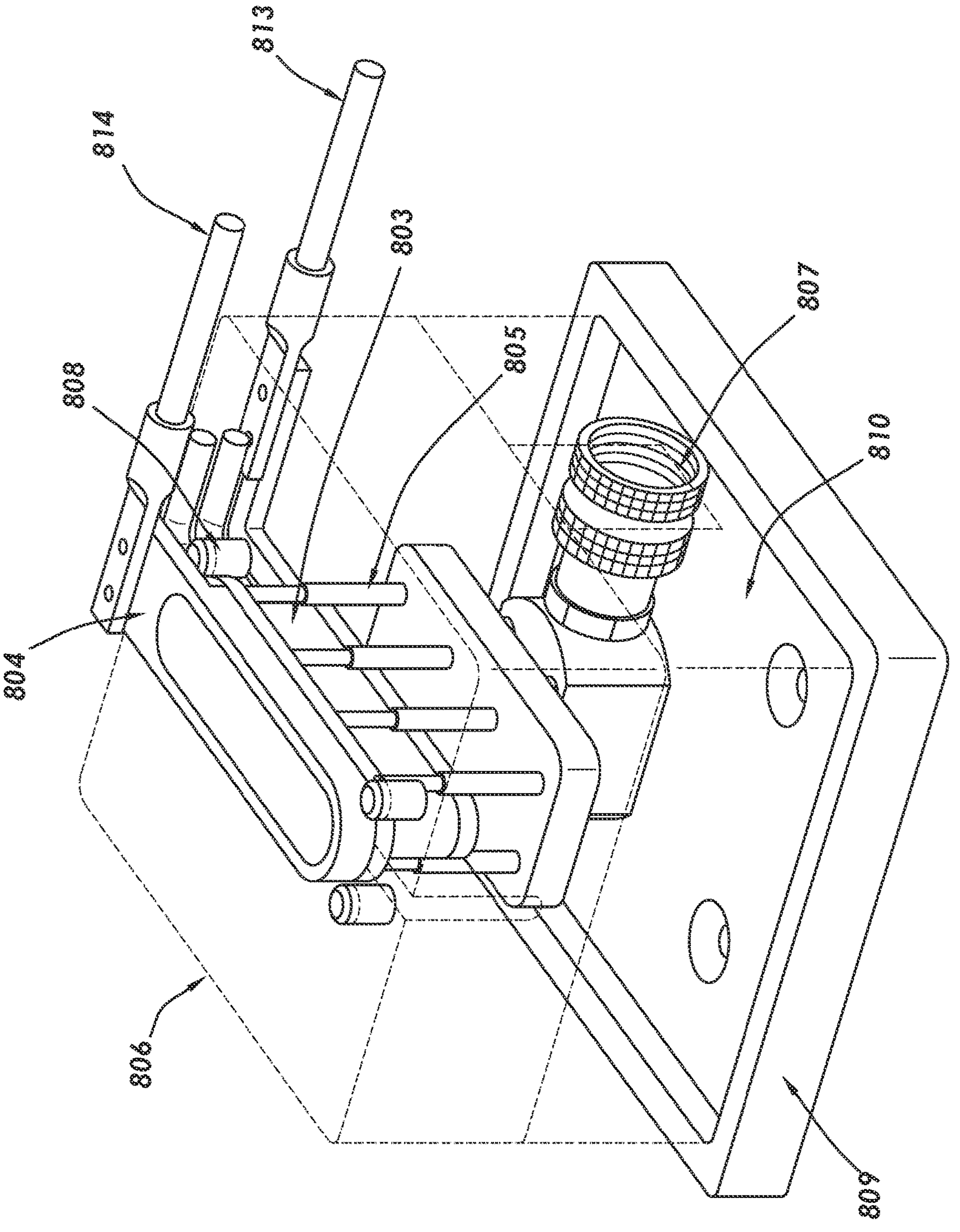
FIG. 15 depicts an apparatus for spot welding an Ra-226 target insert in accordance with an illustrative embodiment of the present disclosure.

FIG. 14 depicts an exploded view of a spot welding apparatus 800 for a spot welded Ra-226 target insert 100 wherein the protective layer 101 is spot welded to the target insert body 103. Similar to the assembly apparatus 600 and the punch apparatus 700, the spot welding apparatus 800 includes one ore more ejector pins 805, an upper target insert die 806, an ejection pneumatic/hydraulic cylinder 807, one or more alignment pins 808, a base centering plate 809, a lower target insert die 810 and these components perform the same functions as in assembly apparatus 600 and punch apparatus 700, holding the Ra-226 target insert 100 in place, providing alignment of the components of Ra-226 target insert 100 during spot welding, and providing for ejection of Ra-226 target insert 100 from spot welding apparatus 800 after completion of spot welding of protective layer 101 to target insert body 103. In some embodiments, the spot welding apparatus 800 of FIG. 14 may be operated in the same chamber as the assembly apparatus 600 and the punch apparatus 700 and pictured in FIGS. 6-8 and 10-12.

Spot welding apparatus 800 may also include a negative electrode 804 having a corresponding negative lead 814 and a positive electrode 803 having a corresponding positive lead 813. The positive and negative electrodes (803, 804) are disposed above and below the Ra-226 target insert 100 and provide electrical current to spot weld the protective layer 101 to the target insert body 103. The negative lead 814 is coupled to the negative electrode 804 and electrically couples the negative electrode 804 to a negative terminal of an electrical source (not shown), such as a welding generator or capacitor bank. The positive lead 813 is coupled to the positive electrode 803 and electrically couples the positive electrode 803 to a positive terminal of an electrical source (not shown), such as a welding generator or capacitor bank. In some embodiments, the positive electrode 803 may be disposed below the target insert body 103 and the negative electrode 804 may be disposed on top of the protective layer 101, as is illustrated in FIG. 14. In other embodiments, the orientation of the negative electrode 804 and the positive electrode 803 may be reversed from what is illustrated in FIG. 14 and the negative electrode 804 may be disposed below the target insert body 103 and the positive electrode 803 may be disposed on top of the protective layer 101.

Figure 17:
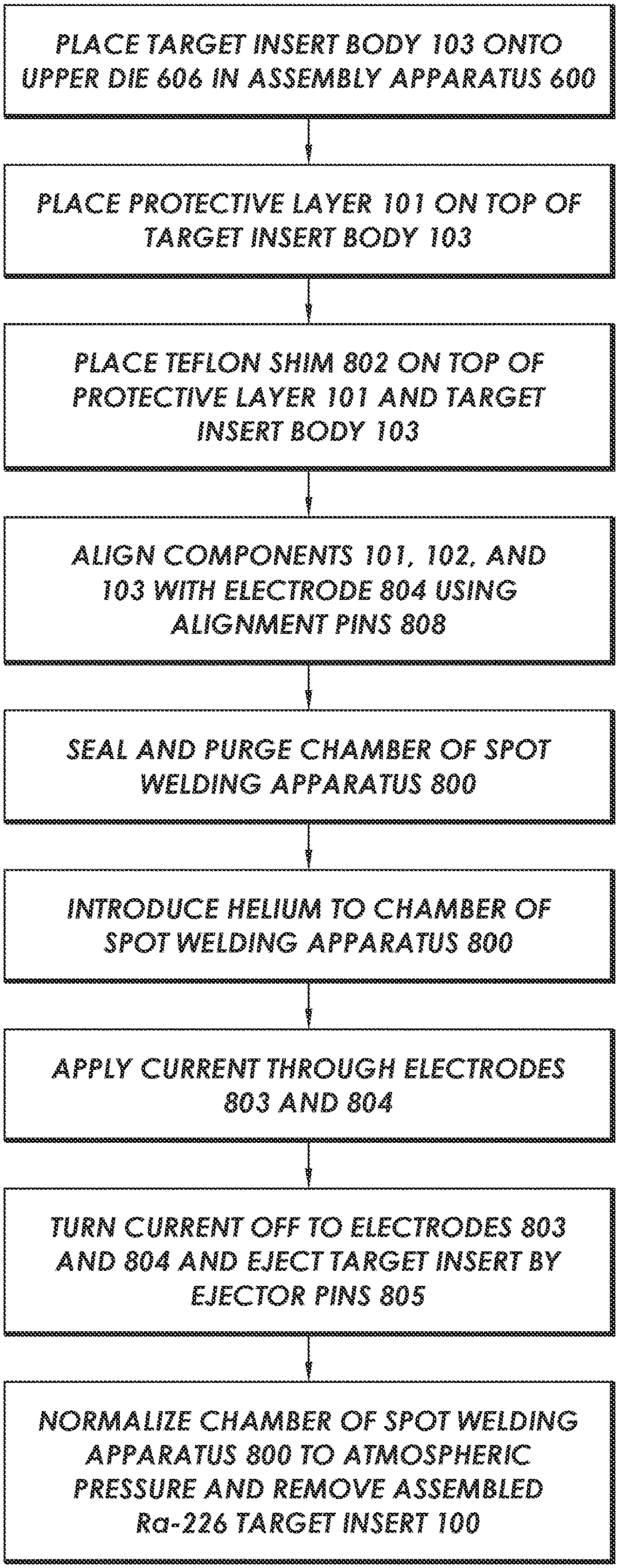
FIG. 17 provides a flow diagram of a method for producing a spot-welded Ra-226 target insert in accordance with certain illustrative embodiments of the present disclosure.
Figure 18:
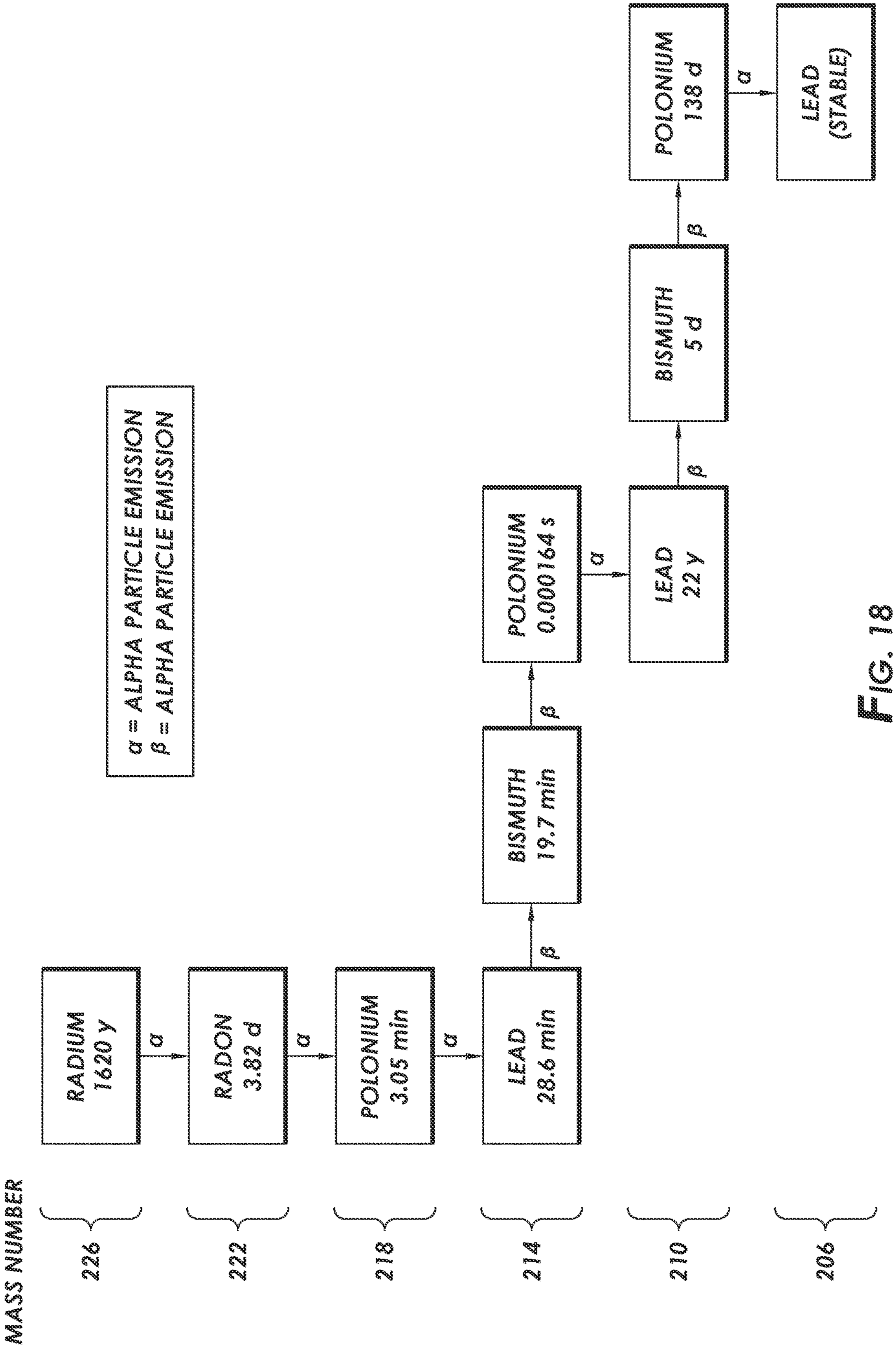
FIG. 18 provides an illustration of the decay chain of Ra-226.

A method for assembly of the Ra-226 target insert by spot welding is illustrated by FIG. 17 and described below according to an illustrative embodiment of the present disclosure. To spot weld the illustrated embodiment of Ra-226 target insert 100, first, the target insert body 103 is placed onto the upper target insert die 806 within the chamber of the spot welding apparatus 800, such as the chamber illustrated with respect to assembly apparatus 600. Next, the protective layer 101 is placed atop the target insert body 103. Next, a Teflon shim 802 is placed atop the protective layer 101 and the target insert body 103. The Teflon shim 802 is a non-conductive polymer cap that insulates the portion of the target insert body 103 having the electroplated area 104 and the portion of the protective layer 101 that covers the electroplated area 104 from electrical current supplied through the negative electrode 804 and the positive electrode 803. Because these portions of the target insert body 103 and the protective layer 101 are insulated from electrical current, they do not heat up and fuse (weld) during spot welding.

Next, the negative electrode 804 is aligned with the perimeter of the protective layer 101 and over the Teflon shim 802 by the one or more alignment pins 808. Next, the internal chamber of the spot-welding apparatus 800 is sealed from the outside environment and is purged of air through a vacuum port such as vacuum port 611 of FIG. 6. After a vacuum has been drawn inside of the chamber containing the spot-welding apparatus 800 through the vacuum port 611, the vacuum port 611 may be closed by a valve (not shown) and the chamber may be filled with an inert gas (e.g., helium) through a gas port, such as gas port 612 of FIG. 6. Next, pressure may be exerted on the negative electrode 804 by a compression pneumatic/hydraulic cylinder such as the pneumatic/hydraulic cylinder 613 to provide compressive force to the negative electrode 804, which helps insure even spot welding around the perimeter of the protective layer 101. Next, a current is applied through the positive electrode 803 and the negative electrode 804. Because Teflon shim 802 insulted the central portion of Ra-226 target insert 100 from this current, the current is conducted through the perimeter of the protective layer 101 and the target insert body 103, which causes them to heat and fuse, thereby welding the protective layer 101 to the target insert body 103. After welding, the assembled Ra-226 target may be ejected from the spot welding apparatus 800 by force applied to the ejector pins 805 through the pneumatic/hydraulic cylinder 807, which actuates the ejector pins 805 in an upward direction and causes separation of the assembled Ra-226 target insert 100 from the upper plate 806. Finally, the chamber of the spot welding apparatus 800 may be normalized to atmospheric pressure so that it can be opened and the spot welded Ra-226 target insert can be removed.

After irradiation of a spot welded Ra-226 target insert 100, the protective layer 101 may be removed from the target insert 100 by punch apparatus 700 in the same manner as described with respect to a crimped Ra-226 target insert 100.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed is:

1. A target insert for the production of Ac-225 in a particle accelerator comprising:

a metal body comprising:

a central flat area for deposition of Ra-226;

a channel surrounding the perimeter of the central flat area;

a hollow section opposite the central flat area; and an area of Ra-226 disposed on the central flat area;

a protective layer disposed atop the area of Ra-226 and conforming to the metal body such that the protective layer is also disposed onto the channel surrounding the perimeter of the central flat area;

and a crimp ring disposed on top of the protective layer in the channel surrounding the perimeter of the central flat area, wherein the crimp ring has been compressed to fill the channel and attach and seal the protective layer to the metal body by deformation of the crimp ring as a result of said compression, wherein the protective layer is attached and sealed to the metal body by the crimp ring alone.

2. The target insert of claim 1, wherein the crimp ring comprises a metal.

3. The target insert of claim 1, wherein the protective layer comprises a metal foil.

4. The target insert of claim 1, wherein the protective layer comprises copper foil, gold foil, aluminum foil, or Havar foil.

5. The target insert of claim 1, wherein the protective layer comprises a metal foil and has a sufficient thickness to degrade a particle accelerator beam to no less than 22.5 MeV.

6. The target insert of claim 1, wherein the metal body further comprises one or more cooling channels.

7. The target insert of claim 1, wherein the metal body comprises a metal selected from the group consisting of aluminum, gold, tungsten, copper, iron, nickel, palladium, platinum, titanium, alloys thereof, and combinations thereof.

8. The target insert of claim 1, wherein the metal body has a shape corresponding to a particle accelerator target body.

9. A target insert for the production of Ac-225 in a particle accelerator comprising:

a metal body comprising:

a central flat area for deposition of Ra-226;

a hollow section opposite the central flat area; and an area of Ra-226 disposed on the central flat area;

a protective layer disposed atop the area of Ra-226 and conforming to the metal body such that the protective layer is attached to the metal body at an area encompassing the perimeter of the area of Ra-226 only by compression induced deformation of a crimp ring situated on top of the protective layer at the area encompassing the perimeter of the area of Ra-226.

10. The target insert of claim 9, wherein the crimp ring comprises a metal.

11. The target insert of claim 9, wherein the protective layer comprises a metal foil.

12. The target insert of claim 9, wherein the protective layer comprises copper foil, gold foil, aluminum foil, or Havar foil.

13. The target insert of claim 9, wherein the protective layer comprises a metal foil and has a sufficient thickness to degrade a particle accelerator beam to no less than 22.5 MeV.

14. The target insert of claim 9, wherein the metal body further comprises one or more cooling channels.

15. The target insert of claim 9, wherein the metal body comprises a metal selected from the group consisting of aluminum, gold, tungsten, copper, iron, nickel, palladium, platinum, titanium, alloys thereof, and combinations thereof.

16. The target insert of claim 9, wherein the metal body has a shape corresponding to a particle accelerator target body.

* * * * *